March 28, 1967   J. J. COCKROFT ETAL   3,311,698
SERVICE ATTACHMENT CONNECTOR FOR SECONDARY DISTRIBUTION SYSTEM
Filed June 11, 1965   2 Sheets-Sheet 1

INVENTORS.
JOHN J. COCKROFT
CHARLES C. SCARLETT
BY ARCHIBALD T. FLOWER
DAVID L. BUCHANAN

ATTORNEY

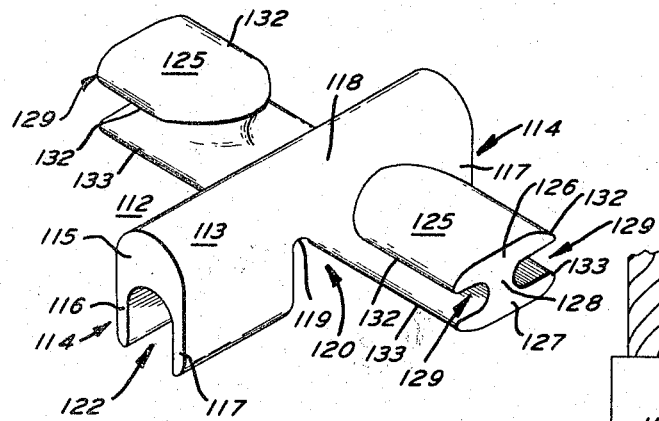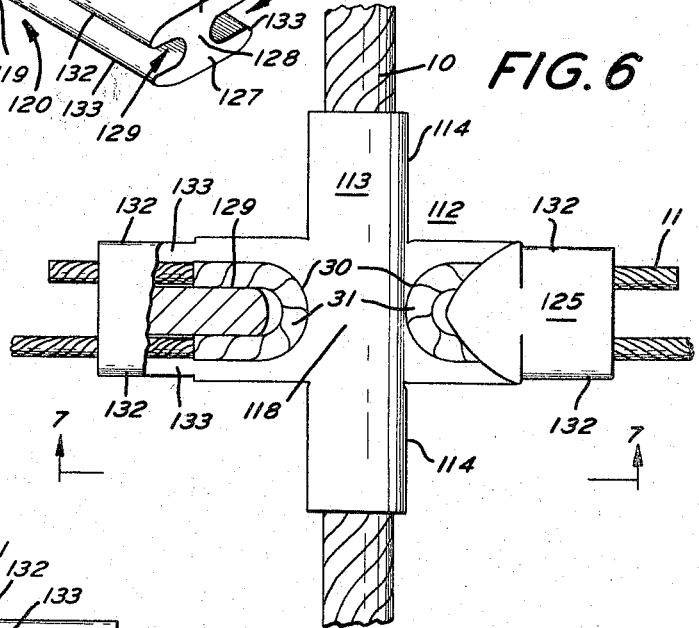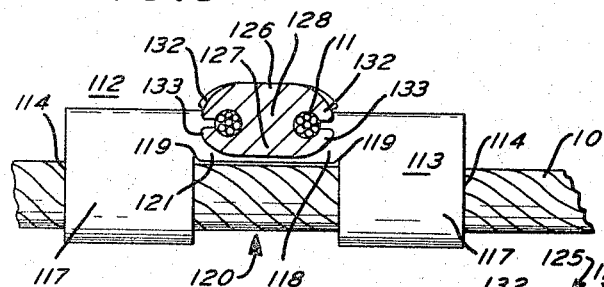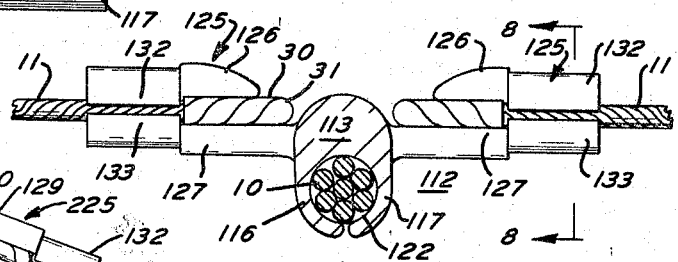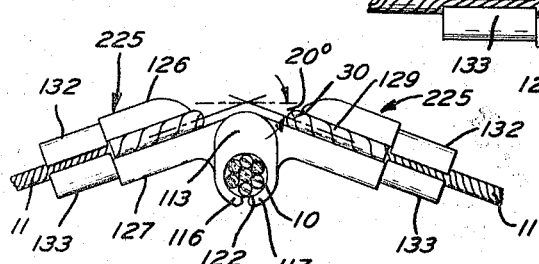
INVENTORS.
JOHN J. COCKROFT
CHARLES C. SCARLETT
BY ARCHIBALD T. FLOWER
DAVID L. BUCHANAN
ATTORNEY

United States Patent Office 3,311,698
Patented Mar. 28, 1967

3,311,698
SERVICE ATTACHMENT CONNECTOR FOR SECONDARY DISTRIBUTION SYSTEM
John J. Cockroft, 739 Blossom Road, Warminster, Pa. 18974; Charles C. Scarlett, 221 S. Wayne Ave., Wayne, Pa. 19087; and Archibald T. Flower, Glenside, and David L. Buchanan, Flourtown, Pa., said Flower and Buchanan assignors to said Cockroft and Scarlett
Filed June 11, 1965, Ser. No. 463,242
12 Claims. (Cl. 174—72)

This invention relates to service attachment connectors for secondaries of electric power distribution lines.

It has heretofore been proposed and is the present practice to install a triplex service cable which includes a messenger of relatively higher tensile strength that supports the energized conductors which can be of lesser tensile strength, the messenger also serving as the neutral or grounded conductor. The hardware for attachment of the neutral of the triplex service cable to the neutral secondary has heretofore commonly consisted of three parts, i.e., (1) a clamp, carrying a loop, which is bolted to the secondary neutral; (2) a wedge clamp which is mechanically attached to the neutral of the triplex service cable and carries a hook that is engaged in the loop; and (3) a compression tap connector which makes the electrical connection between the service neutral and the secondary neutral.

The hardware referred to as well as other provisions for this purpose are complex in construction, require a multiplicity of parts, are unattractive in appearance and have other objectionable features.

It has also heretofore been proposed to provide a wire connector of elongated shape with parallel channels or passages for the reception of wires to be connected, the wires being held by deformation of the channels or passages. These connectors do not adequately accommodate wires which must extend at right angles thereto.

It is the principal object of the present invention to provide a service attachment connector for secondaries of electric power distribution lines which is simple and sturdy in construction, is attractive in appearance, and is relatively easy to install.

It is a further object of the present invention to provide a service attachment connector for secondaries of electric power distribution lines which is made in one piece, thereby reducing problems of over supply or undersupply of separate components, and permitting of drastic reduction in the cost of the hardware.

It is a further object of the present invention to provide a service attachment connector for secondaries of electric power distribution lines which requires only a commonly employed and readily available compression splicing tool, and of one size, for securing the connector in place.

Other objects and advantageous features of the invention will be apparent from the description and claims.

The nature and characteristic features of the invention will be more readily understood from the following description taken in connection with the accompanying drawings forming part thereof, in which:

FIG. 5 is a view in perspective of a modified form of service attachment connector in accordance with the invention;

FIG. 6 is a top plan view, enlarged, of the connector shown in FIG. 5, part being broken away to show the details of construction;

FIG. 7, is a transverse sectional view taken approximately on the line 7—7 of FIG. 6;

FIG. 8 is longitudinal sectional view taken approximately on the line 8—8 of FIG. 7; and FIG. 9 is a longitudinal sectional view, similar to FIG. 7, of another modified form of service attachment connector in accordance with the invention.

Figure 1:
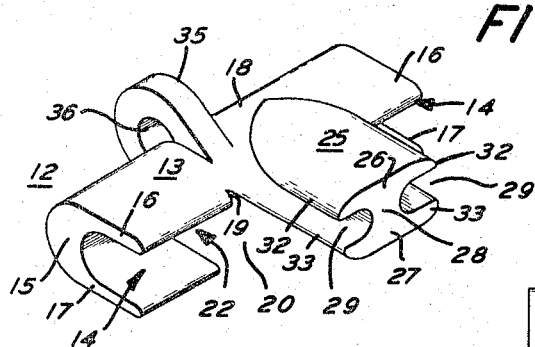
FIGURE 1 is a view in perspective of a preferred form of service attachment connector in accordance with the invention.
Figure 2:
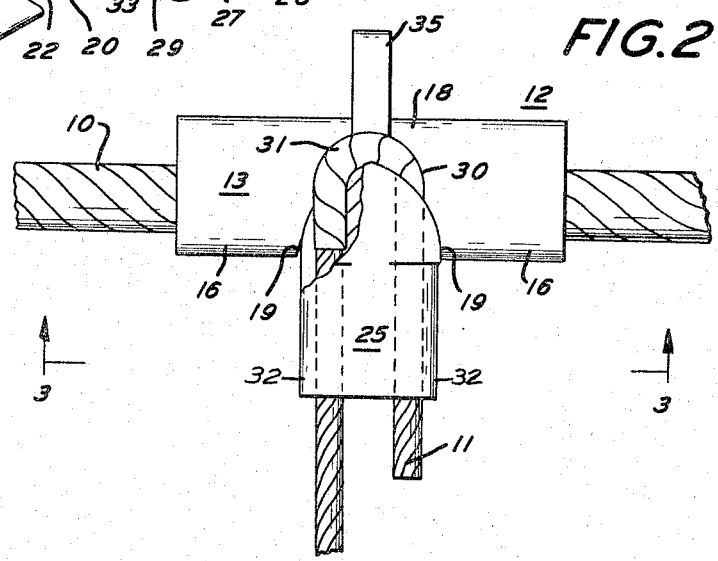
FIG. 2 is a top plan view, enlarged, of the connector of FIG. 1, part being broken away to show the details of construction.
Figure 3:
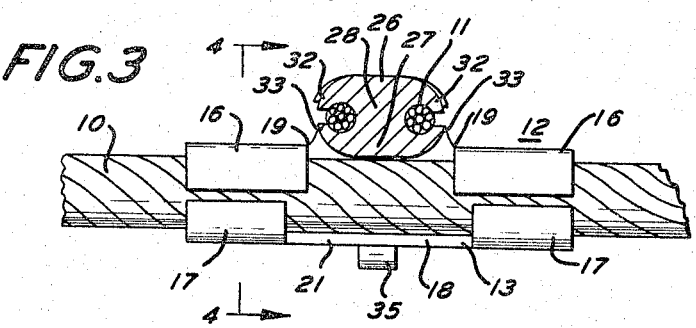
FIG. 3 is a longitudinal sectional view taken approximately on the line 3—3 of FIG. 2.
Figure 4:
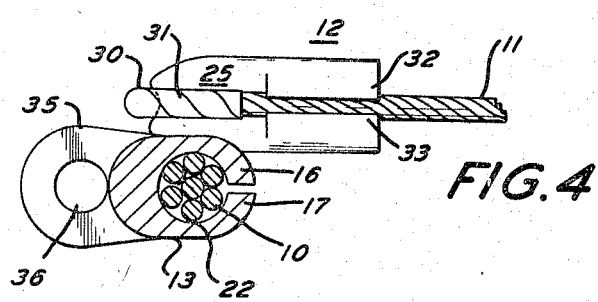
FIG. 4 is a transverse sectional view taken approximately on the line 4—4 of FIG. 3.

It should, of course, be understood that the description and drawings herein are illustrative merely, and that various modifications can be made in the structure disclosed without departing from the spirit of the invention.

Like numerals refer to like parts throughout the several views.

Referring now more particularly to the drawings, a stranded wire or cable 10 is shown which serves as the secondary neutral of the distribution lines, the neutral service conductor 11 also being a standard wire or cable but of smaller size.

Referring now more particularly to FIGS. 1 to 4 of the drawings a connector body 12 is provided of malleable electrically conductive material, such as aluminum. The body 12 has a secondary neutral wire engaging and gripping section 13 which includes a pair of aligned U-shaped portions 14 having a thicker root section 15 and spaced arms 16 and 17. The U-shaped portions 14 have a central connecting portion 18 therebetween with which the arms 16 are continuous except for U-shaped cutouts or notches 19. The connecting portion 18 has a cutaway 20, providing a short arm 21 which is continuous with the arms 17. A channel 22 is thus provided for the reception of the stranded wire or cable 10, the arms 16 and 17 having their end portions bendable toward each other and compressible around the cable 10 to grip and hold the body 12 with respect thereto and thereby provide spaced compression retainers.

The body 12 has integral therewith and in offset relation to the section 13 a neutral service cable engaging and gripping section 25, the relation of the section 25 to the section 13 being that of a T with the section 25 providing the upright or stock of the T.

The section 25 preferably includes plate portions 26 and 27 with a central connection portion 28, the plate portion 27 extending from the arms 16. The portions 26, 27 and 28 have a lateral peripheral U-shaped groove 29 for the reception of a U-shaped bight 30 of the neutral service cable 11. The bight 30 is preferably wrapped with friction tape 31 before bending at that location to hold the bottom of the U-portion and to prevent bird caging of the outer strands upon bending. The bight 30 can be dead ended on one side but permits of taking off two services at each location if desired, in a manner not heretofore possible.

The section 25, beyond the section 13, has parallel margins 32 and 33 of the plate portions 26 and 27 bendable toward each around a cable 11 by the compression splicing tool in gripping and holding relation to the wire 11 on each side of the bight 31 thereby to provide an electrical and mechanical connection. It is to be understood that the tape 31 does not extend far enough around the bight 30 to lie between those portions of the margins 32 and 33 which are to be compressed about the wire 11.

If desired, the body 12 can be provided with an eye 35 extending from the section 13 on the opposite side of the section 13 from the section 25 for the connection of another service wire or a brace, or the like. The eye 35 has an opening 36 with its longitudinal axis parallel to the longitudinal axis of the channel 22.

In a typical secondary distribution system, the secondary neutral conductor may be No. 4/0 AWG steel-reinforced aluminum cable and the service neutral wire may be No. 4 AWG steel-reinforced aluminum cable, for which case the channel 22 and the groove 29 are respectively proportioned to receive these conductors with a slip fit, with the groove 29 being suitably substantially smaller in width. It is obvious, however, that channel 22 and groove 29 may be of any desired proportions suitable to the conductors used.

In the installation of this device, the service neutral wire 11 may be attached to the connector 12 on the ground by preparing a bight 30, disposing it in the grooves 29 and compressing the margins 32 and 33 with a conventional compression splicing tool. The connector 12 together with the attached triplex service entrance cable is then elevated to proximity with the aerial secondary distribution conductors and the section 13 of the connector 12 is hooked over the secondary neutral cable 10 by engaging it in the channel 22. This is a stable position of engagement with the secondary neutral because of tension in the service wire 11, permitting the lineman to use both hands for operation of the compression splicing tool for compressing the arms 16 and 17 about the secondary neutral cable 10.

Referring now to FIGS. 5 to 8 of the drawings, in the embodiment of the invention there shown, the body 112 has a secondary neutral wire engaging and gripping section 113 which includes a pair of aligned U-shaped portions 114 having a thicker root section 115 with spaced arms 116 and 117. The U-shaped portions 114 have a central connecting portion 118 therebetween with which the arms 116 and 117 are continuous except for U-shaped cut-outs 119.

The connecting portion 118 has a cutaway 120 and the portion 118 and U-shaped portions 114 have a channel 122 for the reception of the cable 10. The arms 116 and 117 have their end portions bendable toward each other around the cable 10 to grip the cable 10 and hold the body 112 and cable 10 in relative secured relation.

The body 112 has integral therewith and in offset relation to the channel 122 opposite service neutral engaging and connecting sections 125.

Each of the sections 125 preferably includes plate portions 126 and 127 with a central connecting portion 128, the plate portions 127 extending from the central connecting portion 118. The portions 126, 127 and 128 have a lateral peripheral U-shaped groove 129 for the reception of a U-shaped bight 30 of the neutral service wire 11.

The sections 125 have parallel margins 132 and 133 of the plate portions 126 and 127 bendable toward each other around a cable 11 by the compression splicing tool into gripping and holding relation on each side of a bight, thereby providing an electrical and mechanical connection.

In the use of the device of FIGS. 5 to 8, one of the sections 125 may be made up on the ground and the connection 112 installed on the secondary neutral 10 as described for the device of FIG. 1. The bight 30 of the neutral wire 11 of the opposed service cable is then disposed in the groove 129 of the opposite section 125 of the connector and its opposed margins 132 and 133 are similarly and except for being attached to the centrally wire 11.

Referring to FIG. 9 of the drawings, the embodiment illustrated is similar to the connector of FIGS. 5 to 8 except that it has service neutral gripping sections 225 which are identical with the service neutral gripping sections 125 except for extending outwardly rather than generally coplanarly and except for being attached to the centrally disposed secondary neutral engaging and gripping section 113 at a position nearer the edge opposite the channel 122. The planes of the center lines of the respective U-shaped grooves 129 intersect at an obtuse angle, suitably each making an angle of about 20° with the horizontal. Also, the intersection of these planes may be at such distance above the section 113 that the bottoms of the grooves 129 are tangent to the surface of the section 113 which is opposite the channel 122.

Installation of the device of FIG. 9 is identical with that of FIGS. 5 to 8, except that it may be necessary to spread apart or otherwise deform the preformed bights 30 for insertion in the grooves 129 of the device of FIGS. 5 to 8, whereas they may be readily inserted in the grooves 129 of the device of FIG. 9 without deformation.

It will thus be seen that simple but effective connectors have been provided for carrying out the objects of the invention.

We claim:
1. A service attachment connector comprising
   a unitary body of metal having an elongated secondary cable gripping section and, extending transversely therefrom,
   a service wire gripping section,
   said cable gripping section having a U-shaped channel with spaced pairs of bendable arms.
   said wire gripping section having plate portions with a peripheral wire receiving groove and parallel margins bendable into gripping engagement with a wire.
2. A service attachment connector as defined in claim 1 in which
   the groove of said wire gripping section is U-shaped and the parallel portions thereof are disposed transversely with respect to said channel.
3. A service attachment connector as defined in claim 2 in which
   said groove is substantially smaller in width than said channel.
4. A service attachment connector as defined in claim 1 in which
   said cable gripping section has edge notches at inner margins of said bendable arms.
5. A service attachment connector as defined in claim 1 in which
   said body has an eye portion in opposed relation to said wire gripping section.
6. A service attachment connector as defined in claim 1 in which
   said body has an additional wire gripping section extending from the opposite side thereof from said first mentioned wire gripping section.
7. A service attachment connector as defined in claim 6 in which
   said wire gripping sections are so oriented with respect to each other that the planes of the center lines of said U-shaped grooves intersect at an obtuse angle.
8. A service attachment connector as defined in claim 7 in which
   the intersection of said planes is above said cable gripping section.
9. A service attachment connector as defined in claim 1 in which
   said wire gripping section extends from said cable gripping section intermediate the ends thereof and offset from said channel.
10. A service attachment connector as defined in claim 1 in which
   said cable gripping section has said margins in parallel relation for engagement with said cable at spaced parallel locations.
11. A service attachment connector as defined in claim 1 having
   an opposed pair of said bendable arms disposed on respectively longitudinally opposite sides of said wire gripping section.
12. A service attachment connector comprising
   a unitary body of metal having an
   elongated secondary cable gripping section and, extending transversely therefrom, a wire gripping section, said cable gripping section having an elongated U-shaped channel with spaced pairs of bendable arms for gripping engagement with a cable at spaced locations, said wire gripping section having generally coextensive spaced parallel plate portions with a U-shaped peripheral channel therealong, one of said plate portions extending from the mid-portion of said cable gripping section, said plate portions having pairs of opposed bendable margins in parallel relation spaced longitudinally to said cable gripping section.

References Cited by the Examiner

UNITED STATES PATENTS

| | | | |
|---|---|---|---|
| 2,907,812 | 10/1959 | Sorflaten et al. | 174—71 X |
| 2,935,550 | 5/1960 | Gunthel | 174—71 |
| 2,951,892 | 9/1960 | O'Keefe et al. | 174—71 |
| 2,952,729 | 9/1960 | Wheeler | 174—71 |

LARAMIE E. ASKIN, *Primary Examiner.*